United States Patent
Nobutani et al.

(10) Patent No.: US 10,986,242 B2
(45) Date of Patent: Apr. 20, 2021

(54) INFORMATION PROCESSING APPARATUS AND NON-TRANSITORY COMPUTER READABLE MEDIUM FOR EXITING A POWER SAVING STATE BASED ON DETECTION OF A TARGET

(71) Applicant: FUJI XEROX CO., LTD., Tokyo (JP)

(72) Inventors: Naoya Nobutani, Kanagawa (JP); Masafumi Ono, Kanagawa (JP); Toru Suzuki, Kanagawa (JP); Manabu Hayashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 9 days.

(21) Appl. No.: 15/782,177

(22) Filed: Oct. 12, 2017

(65) Prior Publication Data

US 2018/0270380 A1 Sep. 20, 2018

(30) Foreign Application Priority Data

Mar. 16, 2017 (JP) ................ JP2017-050944

(51) Int. Cl.
*G06F 1/32* (2019.01)
*H04N 1/00* (2006.01)
*G06F 1/3231* (2019.01)
*G06T 7/00* (2017.01)
*G06F 1/3296* (2019.01)
(Continued)

(52) U.S. Cl.
CPC ....... *H04N 1/00896* (2013.01); *G06F 1/3228* (2013.01); *G06F 1/3231* (2013.01); *G06F 1/3284* (2013.01); *G06F 1/3287* (2013.01); *G06F 1/3296* (2013.01);
(Continued)

(58) Field of Classification Search
None
See application file for complete search history.

(56) References Cited

U.S. PATENT DOCUMENTS 7,187,462 B2 * 3/2007 Oakeson ............... G06F 3/1212
358/1.14
9,098,797 B2 8/2015 Yamano
(Continued)

FOREIGN PATENT DOCUMENTS

JP 2013-007847 A 1/2013
JP 2015-000501 A 1/2015

OTHER PUBLICATIONS

Dec. 8, 2020 Office Action issued in Japanese Patent Application No. 2017-050944.

*Primary Examiner* — Danny Chan
(74) *Attorney, Agent, or Firm* — Oliff PLC (57) ABSTRACT

An information processing apparatus includes plural detectors and a transition unit. The plural detectors detect a person and have different detection areas. The transition unit makes a transition from a power saving state to a normal state if a return condition that the person is detected by a predetermined detector among the plural detectors is satisfied, the power saving state being a state in which power lower than usual power is supplied, the normal state being a state in which the usual power is supplied. The transition unit sets, as the return condition, a condition that an intention of using the information processing apparatus by the person is detected and a detector, among the plural detectors, having a detection area wider than a detection area of the predetermined detector detects the person.

10 Claims, 5 Drawing Sheets

(51) Int. Cl.
*G06F 1/3287* (2019.01)
*G06F 1/3228* (2019.01)
*G06F 1/3234* (2019.01)

(52) U.S. Cl.
CPC ....... *G06T 7/0002* (2013.01); *H04N 1/00204* (2013.01); *G06T 2207/30196* (2013.01)

(56) References Cited

U.S. PATENT DOCUMENTS

| | | | | |
|---|---|---|---|---|
| 2004/0073827 A1* | 4/2004 | Tsirkel | G06F 1/3203 | 713/323 |
| 2007/0296778 A1* | 12/2007 | Snyder | B41J 29/38 | 347/88 |
| 2008/0270814 A1* | 10/2008 | Starr | G06F 1/3203 | 713/323 |
| 2009/0228695 A1* | 9/2009 | Pathak | G06F 1/3203 | 713/1 |
| 2010/0128301 A1* | 5/2010 | Bisset | B41J 2/0057 | 358/1.15 |
| 2011/0175626 A1* | 7/2011 | Lee | G06F 3/0416 | 324/629 |
| 2011/0296217 A1* | 12/2011 | Nishimura | G06F 1/3215 | 713/323 |
| 2012/0204046 A1* | 8/2012 | Baba | G06F 1/3231 | 713/323 |
| 2014/0006830 A1* | 1/2014 | Kamhi | G06F 1/3287 | 713/324 |
| 2014/0075230 A1* | 3/2014 | Suggs | H02J 7/35 | 713/323 |
| 2014/0104636 A1* | 4/2014 | Baba | H04N 1/00323 | 358/1.14 |
| 2014/0157032 A1* | 6/2014 | Yokoyama | G06F 1/3215 | 713/323 |
| 2014/0281631 A1* | 9/2014 | Asano | G06F 1/3231 | 713/323 |
| 2015/0006927 A1* | 1/2015 | Ono | G06F 1/3231 | 713/320 |
| 2015/0177817 A1* | 6/2015 | Badri | G06F 1/3268 | 713/320 |
| 2015/0212573 A1* | 7/2015 | Bradford | G06F 1/3284 | 713/323 |
| 2018/0041655 A1* | 2/2018 | Nakajima | G03G 15/5004 | |
| 2018/0101210 A1* | 4/2018 | Fukui | G06F 3/1229 | |

* cited by examiner

INFORMATION PROCESSING APPARATUS AND NON-TRANSITORY COMPUTER READABLE MEDIUM FOR EXITING A POWER SAVING STATE BASED ON DETECTION OF A TARGET

CROSS-REFERENCE TO RELATED APPLICATIONS

This application is based on and claims priority under 35 USC 119 from Japanese Patent Application No. 2017-050944 filed Mar. 16, 2017.

BACKGROUND

Technical Field

The present invention relates to an information processing apparatus and a non-transitory computer readable medium.

SUMMARY

According to an aspect of the invention, there is provided an information processing apparatus including plural detectors and a transition unit. The plural detectors detect a person and have different detection areas. The transition unit makes a transition from a power saving state to a normal state if a return condition that the person is detected by a predetermined detector among the plural detectors is satisfied, the power saving state being a state in which power lower than usual power is supplied, the normal state being a state in which the usual power is supplied. The transition unit sets, as the return condition, a condition that an intention of using the information processing apparatus by the person is detected and a detector, among the plural detectors, having a detection area wider than a detection area of the predetermined detector detects the person.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to FIG. 1 to FIG. 5. In the exemplary embodiments, as an example of an information processing apparatus according to the exemplary embodiments of the present invention, an image processing apparatus is described.

First Exemplary Embodiment

Figure 1:
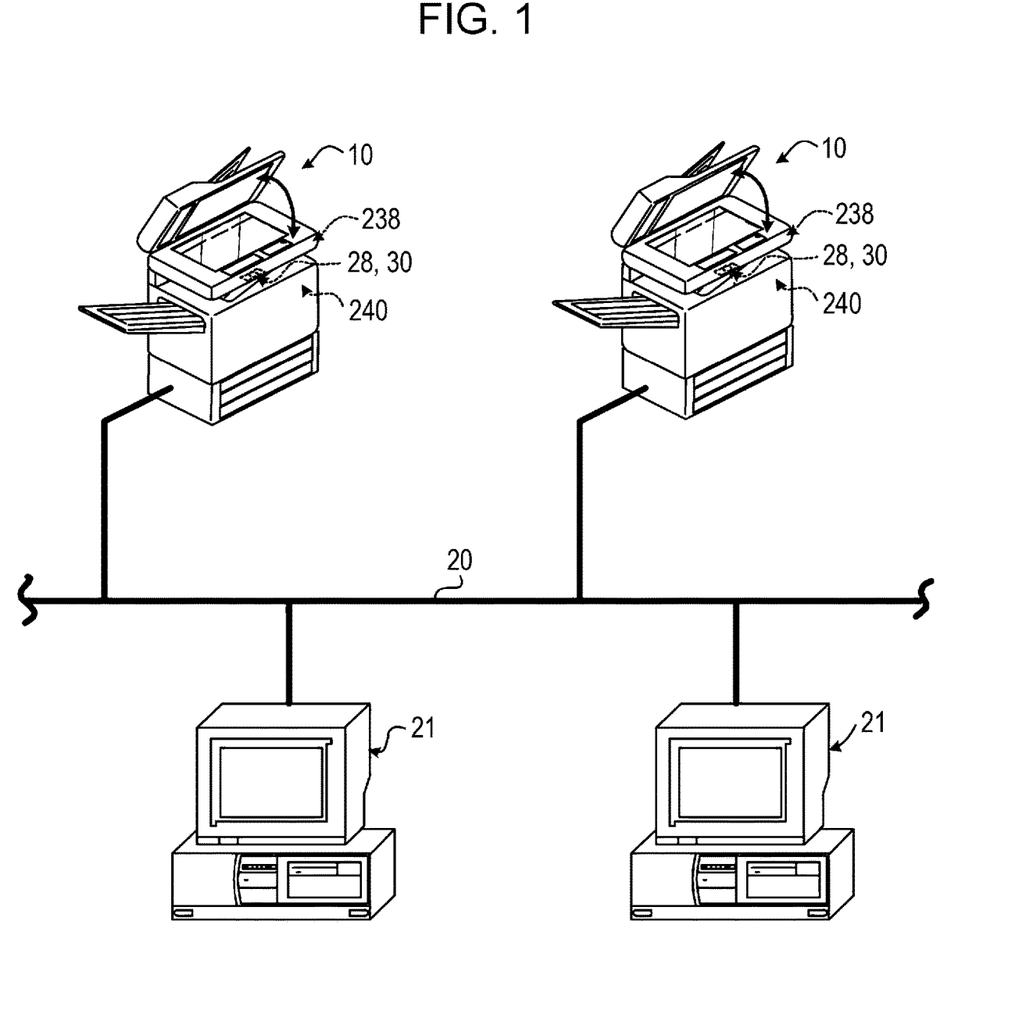
FIG. 1 is a connection diagram illustrating example connections to a communication network including an image processing apparatus according to an exemplary embodiment.

As illustrated in FIG. 1, an image processing apparatus 10 according to a first exemplary embodiment is connected to a communication network 20, which is, for example, the Internet. In FIG. 1, two image processing apparatuses 10 are connected; however, the number of image processing apparatuses 10 is not limited to two and may be one or three or more.

To the communication network 20, plural personal computers (PCs) 21, which are information terminal devices, are connected. In FIG. 1, two PCs 21 are connected; however, the number of PCs 21 is not limited to two and may be one or three or more. The information terminal devices are not limited to the PCs 21 and need not be connected via wirelines. That is, the communication network 20 may be a communication network via which information is wirelessly transmitted and received.

As illustrated in FIG. 1, for example, there may be a case where data is transferred from one of the PCs 21 to one of the image processing apparatuses 10 and an image formation (print) instruction operation is remotely performed at the PC 21, and there may be a case where a user stands in front of one of the image processing apparatuses 10 and performs various operations to thereby give an instruction for performing a process, such as a copy process, a scan (image reading) process, or a facsimile transmission/reception process.

Figure 2:
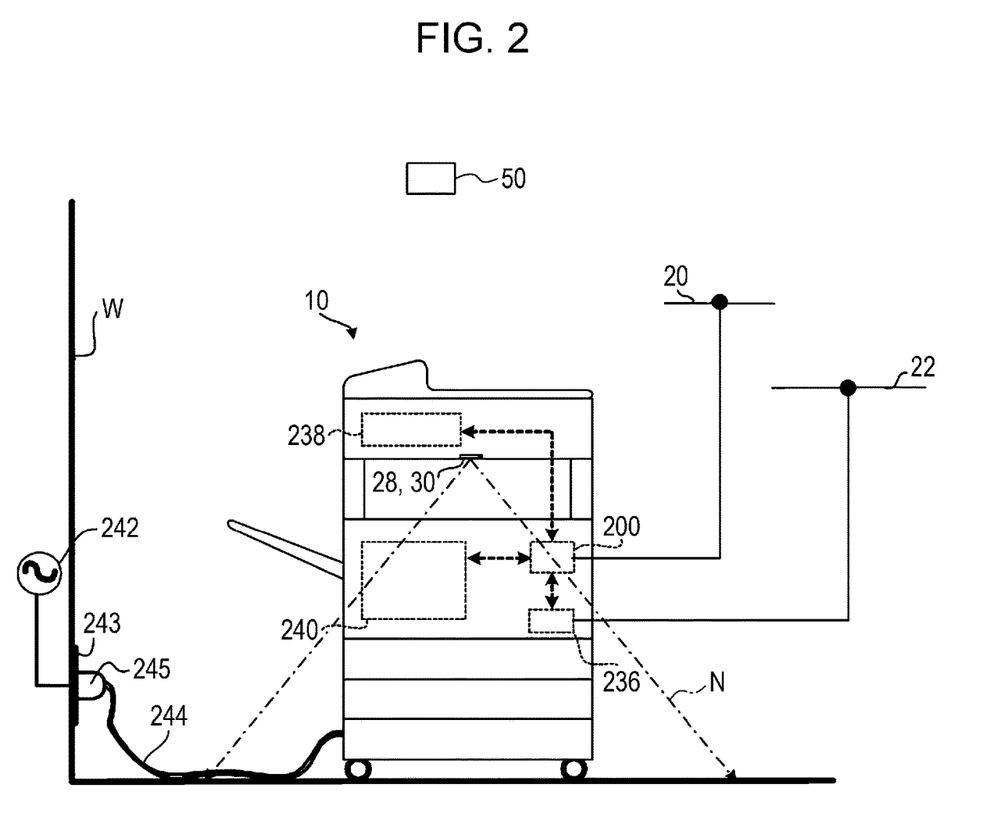
FIG. 2 is a schematic diagram illustrating an example of the image processing apparatus according to an exemplary embodiment.

FIG. 2 illustrates the image processing apparatus 10 according to this exemplary embodiment. The image processing apparatus 10 includes an image forming unit 240, which forms an image on a recording sheet, which is an example of a recording medium, an image reading unit 238, which reads an image of an original document, and a facsimile communication control circuit 236. The image processing apparatus 10 further includes a main controller 200, which controls the image forming unit 240, the image reading unit 238, and the facsimile communication control circuit 236 to temporarily store image data of an image of an original document read by the image reading unit 238 and to feed the image data obtained as a result of reading to the image forming unit 240 or the facsimile communication control circuit 236. The main controller 200 is an example of a "transition unit" according to the exemplary embodiments of the present invention.

The main controller 200 is connected to the communication network 20, which is, for example, the Internet, and the facsimile communication control circuit 236 is connected to a telephone network 22. The main controller 200 has functions as follows. The main controller 200 is connected to, for example, a host computer via the communication network 20 to receive image data. Further, the main controller 200 uses the telephone network 22 via the facsimile communication control circuit 236 to perform facsimile reception and facsimile transmission.

The image reading unit 238 includes a platen that is used to position an original document, a scan drive system that scans an image of an original document placed on the platen by illuminating the original document with light, and a photoelectric conversion element, such as a charge-coupled device (CCD), that receives light reflected or passing during the scan by the scan drive system and converts the light to an electric signal.

The image forming unit 240 includes a photoconductor. Around the photoconductor, a charging device that uniformly charges the photoconductor, a scan-exposure unit that scans light beams on the basis of image data, an image development unit that develops an electrostatic latent image formed as a result of scan-exposure by the scan exposure unit, a transfer unit that transfers the developed image on the photoconductor to a recording sheet, and a cleaning unit that cleans the surface of the photoconductor after transfer. On a conveyance path for conveying recording sheets, a fixing unit that fixes an image on the recording sheet after transfer is provided.

As illustrated in FIG. 2, the image processing apparatus 10 is provided with an input power cord 244. At the end of the input power cord 244, a plug 245 is attached. When the plug 245 is plugged into a distribution plate 243 for a commercial power source 242 wired to a wall W, the image processing apparatus 10 is supplied with power from the commercial power source 242.

FIG. 2 illustrates a first sensor 28, a second sensor 30, a camera 50, and a detection area N of the second sensor 30. The first sensor 28 and the second sensor 30 are used in this exemplary embodiment, and the camera 50 may be used in a second exemplary embodiment. The first sensor 28, the second sensor 30, and the camera 50 are examples of "detectors" according to the exemplary embodiments of the present invention.

The hardware configuration of a control system of the image processing apparatus 10 is described with reference to FIG. 3.

As described above, the main controller 200 is connected to the communication network 20. To the main controller 200, the facsimile communication control circuit 236, the image reading unit 238, the image forming unit 240, and a user interface (UI) touch panel 216 are connected via buses, which are data buses and control buses, 33A, 33B, 33C, and 33D, respectively. That is, the main controller 200 centrally controls each processing unit of the image processing apparatus 10.

The image processing apparatus 10 includes a power supply 202, which is connected to the main controller 200 via a bus 33E. The power supply 202 is supplied with power from the commercial power source 242. The power supply 202 is provided with power supply lines 35E, 35A, 35B, 35C, and 35D for supplying power separately to the main controller 200, the facsimile communication control circuit 236, the image reading unit 238, the image forming unit 240, and the UI touch panel 216, respectively. Therefore, the main controller 200 is able to selectively supply power to the processing units (devices) (normal mode) or selectively stop supplying power to the processing units (devices) (power saving mode) to thereby enable full power saving control and partial power saving control.

The main controller 200 is constituted by a central processing unit (CPU), a read-only memory (ROM), a random access memory (RAM), and so on not illustrated. The CPU centrally controls the image processing apparatus 10. The ROM is a memory that stores in advance, for example, a control program for the image processing apparatus 10 or a return-from-power-saving-state process program described below. The RAM is a memory that is used as, for example, a work area used when a program, such as the control program, is executed.

Figure 3:
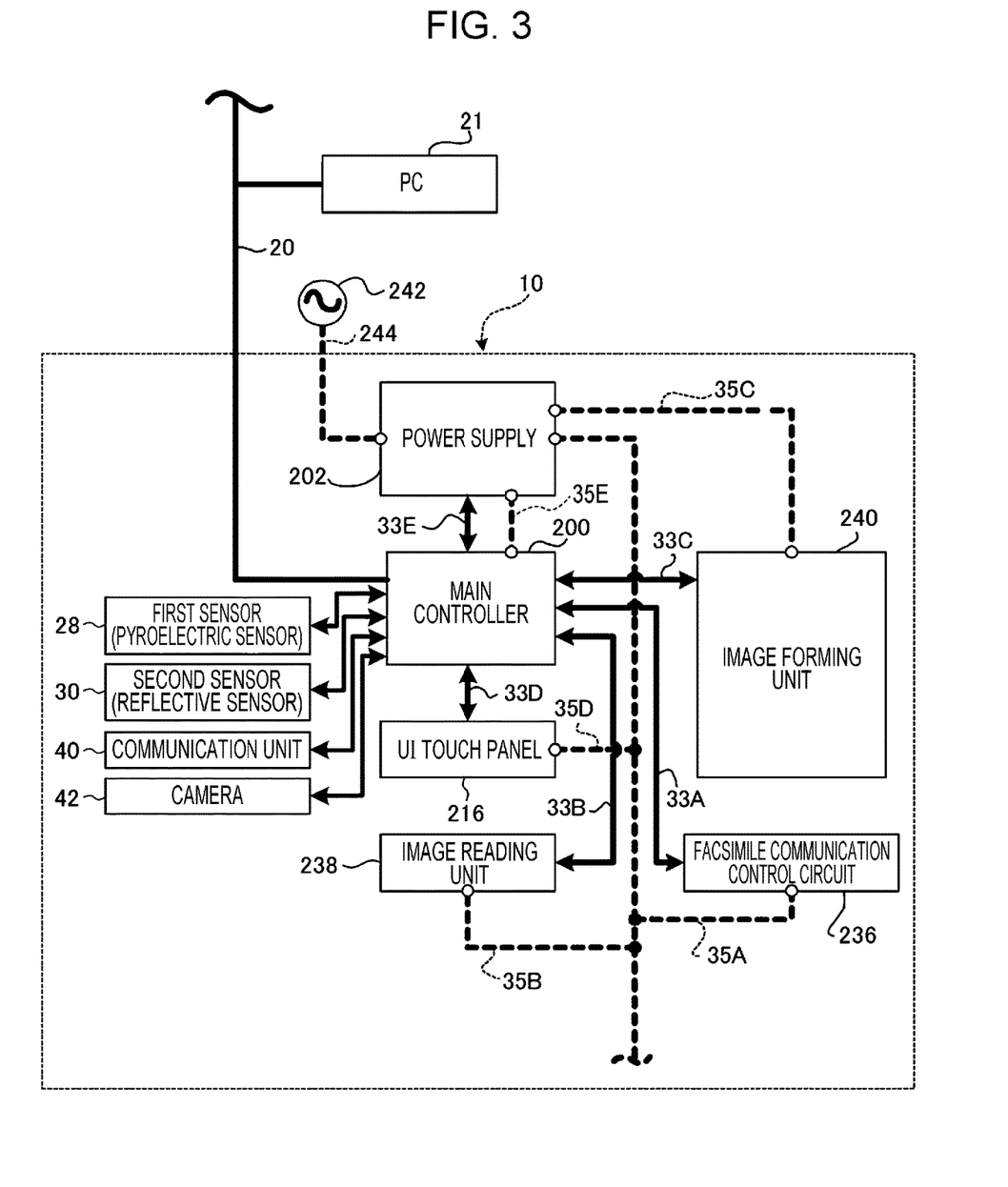
FIG. 3 is a block diagram illustrating an example configuration of a control system of the image processing apparatus according to an exemplary embodiment.

As illustrated in FIG. 3, the first sensor 28, the second sensor 30, a communication unit 40, and a camera 42 are connected to the main controller 200. The first sensor 28 and the second sensor 30 according to this exemplary embodiment are used to monitor the presence of a person around the image processing apparatus 10. The communication unit 40 according to this exemplary embodiment communicates with a portable terminal (external device) carried by a user. The camera 42 as well as the camera 50 may be used in the second exemplary embodiment.

Here, the main controller 200 according to this exemplary embodiment may partially stop the function of the image processing apparatus 10 so that power consumption of the image processing apparatus 10 is minimized. Alternatively, power supply to a large part of the main controller 200 as well as the other processing units may be stopped. These states may be collectively referred to as a "power saving mode". To the main controller 200, a power-saving-mode exit button (not illustrated) is connected. When this power-saving-mode exit button is operated by a user in a power saving state, the image processing apparatus 10 exits the power saving mode.

However, in a case where a user stands in front of the image processing apparatus 10 in the power saving mode, and thereafter, operates the power-saving-mode exit button to resume power supply, it may take time until the image processing apparatus 10 restarts.

Accordingly, the image processing apparatus 10 according to this exemplary embodiment is provided with the first sensor 28 and the second sensor 30 (hereinafter sometimes collectively referred to as "person sensors"), and detects a user by using the person sensors before the user presses the power-saving-mode exit button in the power saving mode and quickly resumes power supply to thereby allow the user to use the image processing apparatus 10 sooner. Although the power-saving-mode exit button is used together with the first sensor 28 and the second sensor 30, only the first sensor 28 and the second sensor 30 may be used to perform overall monitoring. Hereinafter, an operation for exiting the power saving mode and resuming power supply to the image processing apparatus 10 is referred to as a "return from a power saving state". That is, a "return from a power saving state" is an operation for returning an operation panel and an output apparatus from a power saving state to an operable state.

It is assumed that the first sensor 28 and the second sensor 30 according to this exemplary embodiment are, for example, person sensors. The first sensor 28 and the second sensor 30 need to sense (detect) at least persons. In other words, the first sensor 28 and the second sensor 30 may be sensors that sense (detect) moving objects including persons. Accordingly, as a detection target of the person sensors, a "person" may be mentioned below; however, a robot and so on that performs an operation on behalf of a person is included in the sensing targets in the future. If a special sensor capable of sensing and identifying a person is available, such a special sensor may be used.

The first sensor 28 is designed to detect movement of a person around the image processing apparatus 10. In this case, the first sensor 28 is typically, for example, an infrared sensor using a pyroelectric effect of a pyroelectric element (pyroelectric sensor). In this exemplary embodiment, a pyroelectric sensor is used as the first sensor 28.

A dominant characteristic of a sensor using a pyroelectric effect of a pyroelectric element, which is used as the first sensor 28, is a wide detection area. The pyroelectric sensor senses movement of a person, and therefore, does not detect the presence of a person who stands still in the detection area. For example, a high-level signal is output while a person is moving, and the high-level signal changes to a low-level signal when the person within the detection area stops.

As the second sensor 30, a sensor designed to detect the presence of a person (whether a person is present or not) is used. The sensor used as the second sensor 30 is typically, for example, a reflective sensor that includes a light emitter and a light receiver. This sensor may be configured such that the light emitter and the light receiver are separated from each other.

A dominant characteristic of a reflective sensor, which is used as the second sensor 30, is a capability of detecting, with certainty, the presence of a person in accordance with whether light entering the light receiver is intercepted or not. Further, the amount of light entering the light receiver is limited in accordance with, for example, the amount of light emitted from the light emitter, and therefore, the detection area has a relatively short range.

As the first sensor 28 and the second sensor 30, any sensors capable of providing functions described below may be used, and the first sensor 28 and the second sensor 30 are not limited to a pyroelectric sensor and a reflective sensor, respectively.

Figure 4:
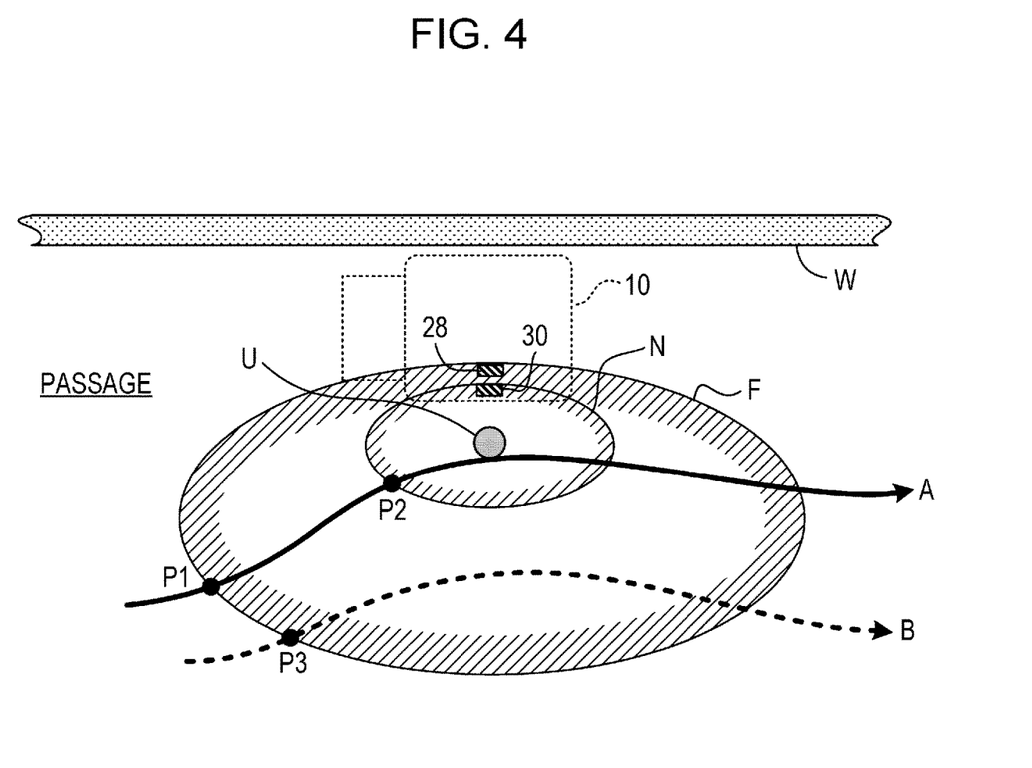
FIG. 4 is a plan illustrating the image processing apparatus according to an exemplary embodiment and its surroundings.

As described above, the first sensor 28 and the second sensor 30 have different detection areas. FIG. 4 is a diagram illustrating the detection areas of the respective sensors. The detection area of the first sensor 28 is illustrated as a detection area F, and the detection area of the second sensor 30 is illustrated as the detection area N. As illustrated in FIG. 4, the detection area F of the first sensor 28 is relatively wider than the detection area N of the second sensor 30.

The image processing apparatus 10 according to this exemplary embodiment, which is provided with the person sensors as described above, has a return-from-power-saving-state mode, and the return-from-power-saving-state mode includes two modes, namely, a normal return mode and a quick return mode. The normal return mode is a mode for returning from a power saving state by using the first sensor 28 and the second sensor 30 and detecting the distance between the image processing apparatus 10 and a person moving toward the image processing apparatus 10. The quick return mode is a mode in which the time until a return from a power saving state (hereinafter referred to as a "return time") is further reduced than the return time in the normal return mode by detecting the user's intention to use the image processing apparatus 10. Here, an "intention of using" an information processing apparatus in this exemplary embodiment corresponds to an instruction or a job containing an indication indicating that the user is highly likely to use the information processing apparatus soon.

First, the normal return mode is described with reference to FIG. 4. In the normal return mode, a trigger for a return from a power saving state (hereinafter referred to as a "return-from-power-saving-state trigger") is set for the second sensor 30. At this time, the first sensor 28 is kept turned on (is kept active), and the second sensor 30 is kept inactive. However, the second sensor 30 need not be kept inactive and may be kept active.

FIG. 4 illustrates example patterns of the line of flow toward the image processing apparatus 10. A pattern A represents the line of flow of a user U using the image processing apparatus 10. That is, in the pattern A, the user U enters the detection area F, subsequently enters the detection area N, operates the image processing apparatus 10, exits the detection area N, and subsequently exits the detection area F. In the case of the pattern A, it is preferable to return the image processing apparatus 10 from a power saving state before the user A operates the image processing apparatus 10 so that the image processing apparatus 10 is operable at about the time the user U reaches the image processing apparatus 10.

Accordingly, in this exemplary embodiment, when the first sensor 28 detects the user U at a point P1 at which the user U reaches the detection area F, the second sensor 30 is turned on (is activated). Next, in a case where the second sensor 30 detects the user U at a point P2, for example, within a predetermined time, the image processing apparatus 10 is made to return from the power saving state. In a case of a pattern B, after the first sensor 28 has detected the user U at a point P3, the second sensor 30 fails to detect the user U, for example, within a predetermined time, and therefore, the image processing apparatus 10 remains in the power saving state. With the above-described operation, wasteful power consumption due to a return from a power saving state is suppressed in the case of the pattern B, and furthermore, the image processing apparatus 10 is made to return from the power saving state before the user U operates the power-saving-mode exit button in the pattern A, resulting in a reduction in the time until the return from the power saving state.

Next, the quick return mode is described. As described above, in the quick return mode, the image processing apparatus 10 is made to return from a power saving state much quicker than in the normal return mode in a case of detecting the user U's intention to use the image processing apparatus 10. That is, in a case where the user U is highly likely to use the image processing apparatus 10, the return-from-power-saving-state trigger is set for the first sensor 28. Then, in a case where the first sensor 28 detects the user U at the point P1, the image processing apparatus 10 is made to return from the power saving state. That is, the image processing apparatus 10 is made to return from the power saving state when the user reaches the point P2 in the normal return mode; however, this operation is changed so that the image processing apparatus 10 is made to return from the power saving state when the user reaches the point P1 in the quick return mode, and therefore, the time until the return from the power saving state is further reduced. Here, in this exemplary embodiment, conditions for detecting an intention of using the image processing apparatus 10, that is, conditions for a transition from the normal return mode to the quick return mode, are specified as follows, for example.

Transition Condition A1

A transition condition A1 is that an output instruction for on-hold printing is given from the user U who is registered in the image processing apparatus 10 and is accumulated in a multifunction peripheral. On-hold printing corresponds to a state where image data for printing is transmitted to the image processing apparatus 10 from, for example, the PC 21 by the user U and is stored in a memory, such as the RAM not illustrated. In this case, the user U is highly likely to operate the image processing apparatus 10 within a certain time from the time when the print instruction was given and to make the on-hold printing output.

Transition Condition A2

A transition condition A2 is that an output instruction for an on-hold facsimile to the user U who is registered in the image processing apparatus 10 is given. An on-hold facsimile corresponds to a state where image data received by a facsimile reception function of the image processing apparatus 10 via the telephone network 22 is stored in a memory, such as the RAM not illustrated. In this case, the user U is highly likely to operate the image processing apparatus 10 within a certain time from the time when the image data was received and to make the on-hold facsimile output.

Transition Condition A3

A transition condition A3 is that the image processing apparatus 10 is paired with an external terminal via wireless communication. As illustrated in FIG. 3, the image processing apparatus 10 according to this exemplary embodiment includes the communication unit 40. The communication unit 40 is a unit that, for example, cooperates with a communication function of a portable terminal (for example, a smartphone or a tablet terminal) carried by the user U to transmit/receive image data and so on to/from the portable terminal within the communication area. When devices having a communication function are paired with each other, the devices enter a state where the devices are able to communicate with each other. In the case where the image processing apparatus 10 is paired with a portable terminal, the image processing apparatus 10 is highly likely to transmit/receive data to/from the portable terminal, or the portable terminal is highly likely to give a print instruction and so on. Further, in a case where a specific screen, such as a screen for instructing the image processing apparatus 10 to perform a process, such as a print process or a scan process, is displayed on the portable terminal, or in a case where an application is activated in the portable terminal, it may be determined that the user U is highly likely to use the image processing apparatus 10. In a case of using this transition condition, power needs to be supplied to the communication unit 40 in the power saving mode. Further, in this transition condition, the method for wireless communication is not specifically limited. For example, a short-range wireless communication method, such as Bluetooth (registered trademark) or WiFi, may be used.

Transition Condition A4

A transition condition A4 is that a time period during which the usage of the image processing apparatus 10 is high begins. The usage is calculated by, for example, counting the number of times the image processing apparatus 10 is used (the number of jobs) in a day on a per 30-minutes basis, extracting time periods during which the number of times the image processing apparatus 10 is used is equal to or larger than a predetermined value, and the time periods are normalized by using the maximum number of times the image processing apparatus 10 is used. Alternatively, the number of times the image processing apparatus 10 is used may be counted on a per day basis. In this case, the transition condition A4 is that a day of the week in which the usage of the image processing apparatus 10 is high comes. Alternatively, the time period and the day of the week may be combined, and the specific time period in the specific day of the week may be regarded as the time period during which the usage is high.

Any one of the transition condition A1 to the transition condition A4 described above is used to detect an intention of using the image processing apparatus 10, or two or more of the transition condition A1 to the transition condition A4 may be combined and used. That is, it may be determined that an intention of using the image processing apparatus 10 is detected in a case where both the condition based on an output instruction for on-hold printing (or an output instruction for a received facsimile) and the condition based on the usage are satisfied. Alternatively, it may be determined that an intention of using the image processing apparatus 10 is detected in a case where both the condition based on pairing with a portable terminal and the condition based on the usage are satisfied.

The above-described conditions are conditions for a transition from the normal return mode to the quick return mode. Conditions for a transition from the quick return mode to the normal return mode need to be specified as follows, for example.

Transition Condition B1

In a case where the user U does not approach the image processing apparatus 10 at all after the elapse of a predetermined time (for example, 30 minutes) since giving an output instruction for on-hold printing, the return-from-power-saving-state mode is made to return from the quick return mode to the normal return mode.

Transition Condition B2

In a case where on-hold printing is output, the return-from-power-saving-state mode is made to return from the quick return mode to the normal return mode. In a case where plural instructions for on-hold printing are given, the return-from-power-saving-state mode is made to return from the quick return mode to the normal return mode in a case where output for all printing is completed or output for printing corresponding to the last print instruction is completed.

Transition Condition B3

In a case where a short-range wireless connection with the portable terminal is disconnected, the return-from-power-saving-state mode is made to return from the quick return mode to the normal return mode.

Figure 5:
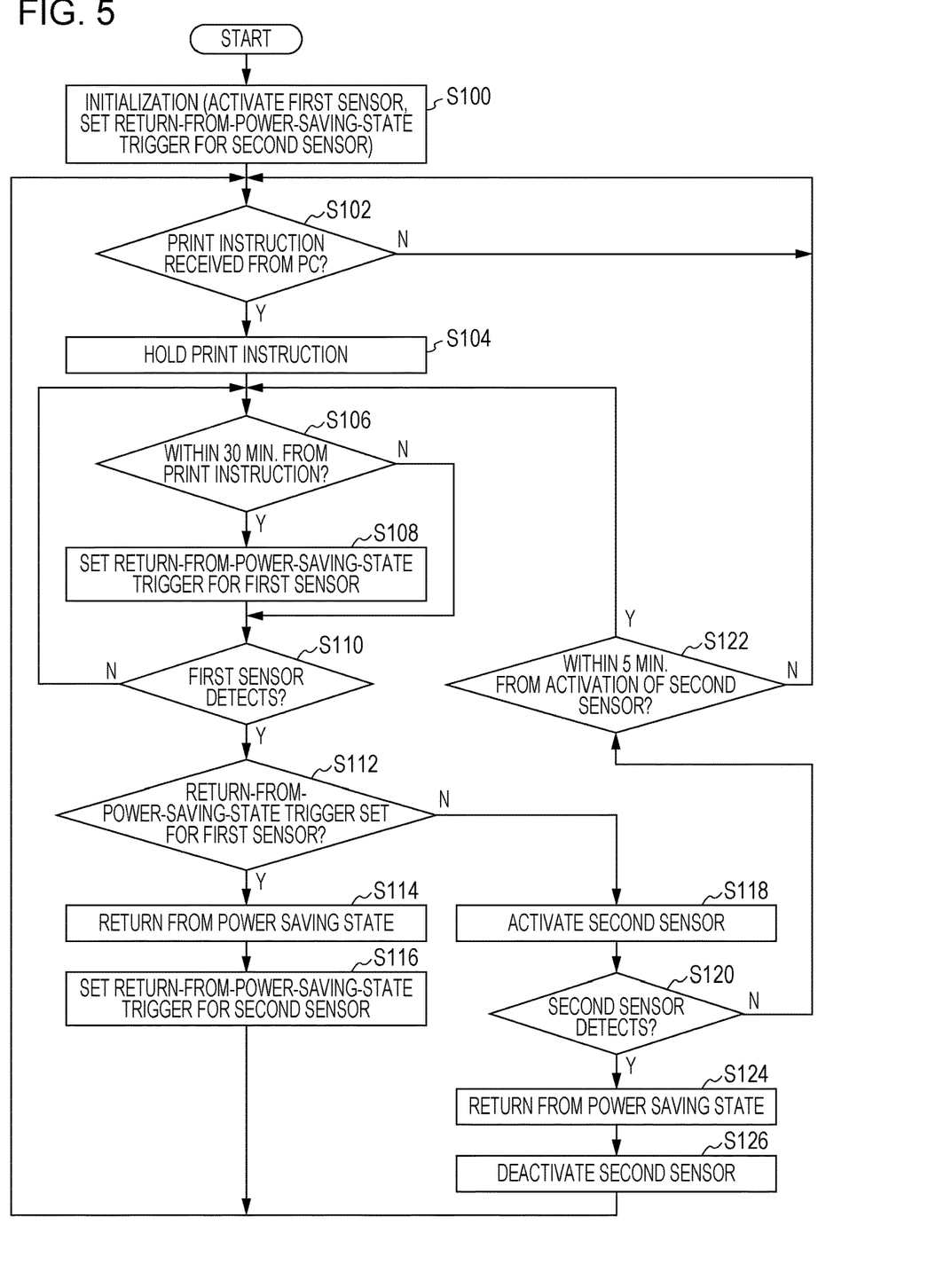
FIG. 5 is a flowchart illustrating a flow of a return-from-power-saving-state process according to a first exemplary embodiment.

Now, a return-from-power-saving-state process for controlling a return from a power saving state in the image processing apparatus 10 according to this exemplary embodiment is described with reference to FIG. 5. FIG. 5 is a flowchart illustrating this exemplary embodiment based on, for example, the case of an output instruction for on-hold printing, that is, a flowchart illustrating a flow of a return-from-power-saving-state process program based on the transition conditions A1 and B1. The process illustrated in FIG. 5 is started when, for example, the commercial power source 242 is connected to the image processing apparatus 10, and the CPU not illustrated reads the return-from-power-saving-state process program stored in the ROM. In this exemplary embodiment, an example form in which the return-from-power-saving-state process program is stored in advance in, for example, the ROM is described. However, this exemplary embodiment is not limited to this form, and a form in which the return-from-power-saving-state process program is stored in a computer-readable storage medium and provided may be employed, or a form in which the return-from-power-saving-state process program is distributed via a wireline or wireless communication system may be employed.

First, in step S100, initialization is performed. Initialization according to this exemplary embodiment is initialization for setting the return-from-power-saving-state mode to the normal return mode. At this time, the first sensor 28 is activated, and the return-from-power-saving-state trigger is set for the second sensor 30. Here, the second sensor 30 may be kept inactive. Thereafter, in a case where the image processing apparatus 10 is not used by the user U for a predetermined period (for example, a predetermined time elapsed since the last use and measured by an automatic timer), the image processing apparatus 10 remains in the initialized state, is in the usual power saving mode, and is kept on standby. In this exemplary embodiment, at the time point of step S100, power is supplied to only the main controller 200.

Next, in step S102, the image processing apparatus 10 is kept on standby until the user U instructs the image processing apparatus 10 to print, for example, desired document data from, for example, the PC 21 via a printer driver. After a print instruction has been received (Y in step S102), the flow proceeds to step S104.

Next, in step S104, the image processing apparatus 10 receives document data and a user ID indicated by the print instruction, checks to see if the user is allowed to give a print instruction, and holds the print instruction and so on in a memory, such as the RAM not illustrated if the user is a registered user. At the time point of step S104, power supply to only the main controller 200 is maintained, and the image processing apparatus 10 is not allowed to return from the power saving state.

Next, in step S106, it is determined whether the time elapsed since the reception of the print instruction in step S102 is 30 minutes or less (transition condition B1). The elapsed time is measured by, for example, a timer (not illustrated) provided in the image processing apparatus 10 measuring the time elapsed since the reception of the print instruction. If the determination in step S106 results in negative determination (N in step S106), the flow proceeds to step S110. If the determination in step S106 results in positive determination (Y in step S106), the flow proceeds to step S108. The image processing apparatus 10 is kept on standby for 30 minutes after the reception of the print instruction in order to take into consideration a case where the user U fails to move to the image processing apparatus 10 immediately after giving the print instruction. The time used in step S106 is set to, for example, 30 minutes and may be set to any appropriate time by taking into account, for example, the frequency of use of the image processing apparatus 10.

In step S108, the return-from-power-saving-state trigger is set for the first sensor 28. The user U has given the print instruction, and the predetermined time has not elapsed, and therefore, it is inferred that the user U moves to the image processing apparatus 10 and performs print output shortly. Accordingly, the return-from-power-saving-state mode is changed from the normal return mode to the quick return mode. That is, the return-from-power-saving-state condition is changed from a condition that the image processing apparatus 10 returns from the power saving state in response to detection of the user U by the second sensor 30 to a condition that the image processing apparatus 10 returns from the power saving state in response to detection of the user U by the first sensor 28.

Next, in step S110, it is determined whether the first sensor 28 detects the user U. If the determination results in negative determination (N in step S110), the flow returns to step S106, and the image processing apparatus 10 is continuously kept on standby. If the determination in step S110 results in positive determination (Y in step S110), the flow proceeds to step S112.

In step S112, it is determined whether the return-from-power-saving-state trigger is currently set for the first sensor 28. If the determination in step S112 results in negative determination (N in step S112), the flow proceeds to step S118. If the determination in step S112 results in positive determination (Y in step S112), the flow proceeds to step S114.

In step S114, the image processing apparatus 10 is made to return from the power saving state. This return from the power saving state is a return based on the quick return mode. Subsequently, in step S116, the return-from-power-saving-state trigger is set for the second sensor 30, that is, the return-from-power-saving-state mode is made to transition to the normal return mode. Thereafter, the flow returns to step S102, and the image processing apparatus 10 is kept on standby until the next event that triggers an operation occurs. In step S116, the return-from-power-saving-state trigger may be set for the second sensor 30 after an operation related to the print instruction given by the user U is completed.

In step S118, the second sensor 30 is activated. This is because the time elapsed since the reception of the print instruction in step S102 reaches 30 minutes in step S106, and switching to the quick return mode is not performed accordingly.

Next, in step S120, it is determined whether the second sensor 30 detects the user U. If the determination in step S120 results in negative determination (N in step S120), the flow proceeds to step S122. If the determination in step S120 results in positive determination (Y in step S120), the flow proceeds to step S124.

In step S122, it is determined whether the time elapsed since the activation of the second sensor 30 is 5 minutes or less. If the determination in step 122 results in negative determination (N in step S122), the flow returns to step S102, and the image processing apparatus 10 is kept on standby until a print instruction is given. If the determination in step 122 results in negative determination, it is determined that the user U only goes past the image processing apparatus 10 (see the pattern B in FIG. 4). If the determination in step 122 results in positive determination (Y in step S122), the flow returns to step S106. The time used in step S122 is set to, for example, 5 minutes and may be set to any appropriate value by taking into account a power saving effect and so on.

In step S124, the image processing apparatus 10 is made to return from the power saving state. This return from the power saving state is a return based on the normal return mode. Next, in step S126, the second sensor 30 is deactivated. Thereafter, the flow returns to step 102, and the image processing apparatus 10 is kept on standby until a print instruction is given.

The return-from-power-saving-state process performed in the case of the transition condition A1 has been described above. The return-from-power-saving-state processes in the cases of the transition conditions A2 to A4 are also performed in accordance with flows similar to the flow in FIG. 5. The return-from-power-saving-state process performed in the case of the transition condition A3 and that performed in the case of the transition condition A4 are supplementarily described below.

In the Case of the Transition Condition A3

In a case where the image processing apparatus 10 is not used by the user U for a predetermined period, the return-from-power-saving-state mode is set to the normal return mode, and the image processing apparatus 10 is kept on standby. In this case, the return-from-power-saving-state trigger is set for the second sensor 30. In the next step, if a request for pairing is made by a portable terminal and a connection is established, the return-from-power-saving-state mode is made to transition to the quick return mode, and the image processing apparatus 10 is kept on standby. At this time, the return-from-power-saving-state trigger is switched to the first sensor 28. In the next step, in a case where the first sensor 28 detects the user U approaching, the image processing apparatus 10 is made to return from the power saving state. After the return from the power saving state, the return-from-power-saving-state trigger is switched to the second sensor 30, and the return-from-power-saving-state mode is made to transition to the normal return mode.

In the Case of the Transition Condition A4

It is assumed that the time period during which the usage is high is set to, for example, a time period from 9:00 to 9:30 a.m. on every Monday on the basis of a use history. This is a case where, for example, a regular meeting is held from 10:00 a.m. every Monday, and processes for copying documents used in the regular meeting are collectively performed. In a case where the image processing apparatus 10 is not used by the user U for a predetermined period, the return-from-power-saving-state mode is set to the normal return mode, and the image processing apparatus 10 is kept on standby. In this case, the return-from-power-saving-state trigger is set for the second sensor 30. In the next step, at 9:00 a.m., the image processing apparatus 10 makes the return-from-power-saving-state mode transition to the quick return mode, and goes on standby. In the next step, in a case where the first sensor 28 detects the user U approaching, the image processing apparatus 10 is made to return from the power saving state. After the return from the power saving state, the return-from-power-saving-state trigger is switched to the second sensor 30, and the return-from-power-saving-state mode is made to transition to the normal return mode.

Second Exemplary Embodiment

An information processing apparatus according to the second exemplary embodiment is described with reference to FIG. 2. The first exemplary embodiment has been described while assuming the example case where the number of sensors that detect a person is two; however, the number of sensors may be one or three or more. The second exemplary embodiment describes a form in a case where the number of sensors that detect a person is one. As the one sensor, the first sensor 28 or the second sensor 30 described above may be used; however, this exemplary embodiment is described while assuming that the one sensor is, for example, a camera. The camera that serves as the sensor may be provided in the image processing apparatus, or a camera placed in a location other than the image processing apparatus may be used. In this exemplary embodiment, the camera 50 placed on the wall W as illustrated in FIG. 2 and having a predetermined image-capture area is used as the sensor. FIG. 3 illustrates the case where the camera 42 is provided in the image processing apparatus 10. In this case, the camera 42 as well as the first sensor 28 and the second sensor 30 is connected to the main controller 200 and is controlled by the main controller 200. The image processing apparatus according to this exemplary embodiment is similar to the image processing apparatus 10, and therefore, the figures that illustrate the image processing apparatus 10 are referred to as needed.

As illustrated in FIG. 2, the camera 50 placed on the wall W captures an image of a predetermined area around the image processing apparatus 10. The camera 50 is connected to the image processing apparatus 10 via, for example, the communication network 20. The main controller 200 receives image information from the camera 50 and is able to detect the user U present in the image-capture area.

The main controller 200 of the image processing apparatus 10 according to this exemplary embodiment recognizes "detection of a person" and "detection of approaching" of the user U from an image captured by using the camera 50 while distinguishing "detection of a person" and "detection of approaching" from each other. In this exemplary embodiment, "detection of a person" corresponds to a case where the user U enters the image-capture area of the camera 50, and "detection of approaching" corresponds to a case where the user U approaches the image processing apparatus 10 and enters a predetermined area around the image processing apparatus 10. Detection of approaching is used as the return-from-power-saving-state trigger in the normal return mode, and detection of a person is used as the return-from-power-saving-state trigger in the quick return mode. In this case, the procedure of a return-from-power-saving-state process according to this exemplary embodiment is as follows.

Step 1: In a case where the image processing apparatus 10 is not used by the user U for a predetermined period, the return-from-power-saving-state mode is set to the normal return mode, and the image processing apparatus 10 is kept on standby. In the case of the normal return mode, the image processing apparatus 10 is made to return from the power saving state after the camera 50 has detected a person and has detected the person approaching.

Step 2: In a case where the image processing apparatus 10 detects an intention of using the image processing apparatus 10, the return-from-power-saving-state mode is made to transition from the normal return mode to the quick return mode. Thereafter, in a case where a person is detected, the image processing apparatus 10 is made to return from the power saving state. Subsequently, the return-from-power-saving-state mode is made to transition from the quick return mode to the normal return mode, and the image processing apparatus 10 goes on standby.

In this exemplary embodiment, the example form has been described in which the main controller 200 recognizes "detection of a person" and "detection of approaching" of the user U from an image captured by using the camera 50 while distinguishing "detection of a person" and "detection of approaching" from each other; however, this exemplary embodiment is not limited to this example form. For example, another form may be employed in which the camera 50 uses, for example, a controller built in the camera 50 to perform determination on a person present within the image-capture area (determination as to, for example, whether "a person is present" or "a person is approaching"), the image processing apparatus 10 receives the result of determination via, for example, the communication network 20, and the main controller 200 uses the result of determination to perform a subsequent mode transition process.

In the above-described exemplary embodiments, as an example mode that is made to transition, the return-from-power-saving-state mode has been described; however, the exemplary embodiments are not limited to this. The mode transition process according to the above-described exemplary embodiments may be applied to any information processing apparatus having plural modes.

In the above-described exemplary embodiments, the example form in which the entire image processing apparatus is a target that is made to return from a power saving state has been described; however, the exemplary embodiments are not limited to this form. Another form may be employed in which part of the image processing apparatus, namely, for example, only part of the image processing apparatus related to a function expected to be used in accordance with a detected intention of using the image processing apparatus, may be made to return from a power saving state. In this case, for example, in a case where the intention of using the image processing apparatus is an intention of outputting on-hold printing, only part of the image processing apparatus related to image formation is made to return from the power saving state.

In the above-described exemplary embodiments, the form in which person sensors are used as the sensors for detecting a person and the form in which a camera is used as the sensor for detecting a person have been described. As a matter of course, a form may be employed in which a person sensor and a camera are combined as the sensors for detecting a person. In this case, a form may be employed in which, for example, the second sensor 30 having a narrower detection area is replaced by the camera 50, and the camera 50 and the first sensor 28 are combined. That is, an event in which the camera 50 detects a person is assumed to be the return-from-power-saving-state trigger in the quick return mode, and an event in which the first sensor 28 detects a person is assumed to be the return-from-power-saving-state trigger in the normal return mode.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a first detector and a second detector that detect a person, the first detector having a wider detection area than the second detector;
    a communication unit that communicates with an external device; and
    a processor configured to:
        detect whether an intention of using the information processing apparatus by a person exists or not, and in a case where the intention exists, determine whether a predetermined time since detection of the intention has elapsed,
        wherein the intention of using the information processing apparatus comprises a state where the external device is entered, by the communication unit, into a state where the external device is paired with the information processing apparatus;
        determine whether the first detector has detected the person;
        in a case where the first detector has detected the person and the predetermined time since detection of the intention has elapsed, activate the second detector and then change the information processing apparatus from a power saving state to a normal state if the person is detected by the second detector; and
        in a case where the first detector has detected the person and the predetermined time since the detection of the intention has not elapsed, change the information processing apparatus from the power saving state to the normal state,
        wherein the power saving state is a state whose power consumption is lower than that of the normal state.

2. The information processing apparatus according to claim 1, wherein the processor is further configured to:
    deactivate the second detector if the information processing apparatus is changed to the normal state as a result of detection of the person by the second detector.

3. The information processing apparatus according to claim 1, wherein
    detection of the person by the first detector or the second detector is a return condition for changing the state from the power saving state to the normal state, and
    the processor is further configured to:
    change the return condition to a condition that the second detector detects the person after completion of a process corresponding to the intention of using the information processing apparatus.

4. The information processing apparatus according to claim 2, wherein
    detection of the person by the first detector or the second detector is a return condition for changing the state from the power saving state to the normal state, and
    the processor is further configured to:
    change the return condition to a condition that the second detector detects the person after completion of a process corresponding to the intention of using the information processing apparatus.

5. The information processing apparatus according to claim 1, wherein
    the first detector and the second detector have detection areas that are set such that a narrower detection area is encompassed by a wider detection area.

6. The information processing apparatus according to claim 1, wherein
    the intention of using the information processing apparatus comprises a state where the external device displays a specific screen or activates a specific application.

7. The information processing apparatus according to claim 1, wherein
    the intention of using the information processing apparatus comprises a time period during which usage of the image processing apparatus is high.

8. The information processing apparatus according to claim 1, further comprising:
    a memory that temporarily stores data, wherein
    the intention of using the information processing apparatus corresponds to an instruction for outputting the data stored in the memory.

9. The information processing apparatus according to claim 1, wherein
    the first detector and the second detector include at least a person sensor or a camera.

10. A non-transitory computer readable medium storing a program causing a computer to execute a process for information processing, the process comprising:
    communicating with an external device;
    detecting whether an intention of using an information processing apparatus by a person exists or not, and in a case where the intention exists, determining whether a predetermined time since detection of the intention has elapsed,
    wherein the intention of using the information processing apparatus comprises a state where the external device is entered into a state where the external device is paired with the information processing apparatus;
    determining whether a first detector has detected the person, the first detector having a wider detection area than a second detector;
    in a case where the first detector has detected the person and the predetermined time since detection of the intention has elapsed, activating the second detector and then changing the information processing apparatus from a power saving state to a normal state if the person is detected by the second detector; and
    in a case where the first detector has detected the person and the predetermined time since the detection of the intention has not elapsed, changing the information processing apparatus from the power saving state to the normal state,
wherein the power saving state is a state whose power consumption is lower than that of the normal state.

* * * * *